United States Patent [19]

Powell et al.

[11] Patent Number: 5,468,434

[45] Date of Patent: Nov. 21, 1995

[54] PROVISION OF COVER IMPERMEABILITY IN MOLD IN PLACE SEAT COMPONENT METHOD

[75] Inventors: Fred D. Powell, Dearborn Heights; Raymond J. Phelan, Lake Orion, both of Mich.; James McCormack, Belle River, Canada; Peter Budansew, Essex, Canada; Larry Demoe, Belle River, Canada; Alex Poschun, Islington, Canada

[73] Assignee: Atoma International Inc., Newmarket, Canada

[21] Appl. No.: 203,353

[22] Filed: Mar. 1, 1994

[51] Int. Cl.⁶ .................................................. B29C 44/14
[52] U.S. Cl. .................. 264/46.8; 264/46.4; 264/245; 264/257; 264/511
[58] Field of Search ................ 264/46.4, 46.6, 264/46.8, 245, 257, 511

[56] References Cited

U.S. PATENT DOCUMENTS

| | | | |
|---|---|---|---|
| 4,247,347 | 1/1981 | Lischer et al. | 264/46.8 |
| 4,264,386 | 4/1981 | Sears, Jr. et al. | 264/46.8 |
| 4,379,039 | 4/1983 | Fujimoto et al. | |
| 4,533,723 | 8/1985 | Weltemeyer. | |
| 4,559,094 | 12/1985 | Hostetler et al. | 264/46.6 |
| 4,758,294 | 7/1988 | Storch | 264/46.6 |
| 4,860,415 | 8/1989 | Witzke | 264/46.8 |
| 5,000,805 | 3/1991 | Lowe | 156/285 |
| 5,098,270 | 3/1992 | Rohn | 425/117 |
| 5,231,745 | 8/1993 | Phelan et al. | 29/91.1 |
| 5,324,462 | 6/1994 | Rohn | 264/46.8 |

FOREIGN PATENT DOCUMENTS

| | | | |
|---|---|---|---|
| 45-24621 | 8/1970 | Japan | 264/46.8 |
| 55-107436 | 8/1980 | Japan | 264/46.8 |
| 58-101029 | 6/1983 | Japan | 264/46.8 |

*Primary Examiner*—Allan R. Kuhns
*Attorney, Agent, or Firm*—Cushman, Darby & Cushman

[57] ABSTRACT

A method of making a cushioned seat component which includes the following steps. First, providing a cover having an exterior surface which is to present the major exterior appearance of the seat component and which includes a panel portion to be cushioned, the panel portion of the cover being perforate between the interior and exterior surfaces thereof. Second, mounting the cover on a vacuum mold so that the exterior surface of the panel portion is facing a mold surface of the vacuum mold having a shape corresponding with the desired exterior surface shape of the panel portion. Third, mounting an imperforate film over the interior surface of the panel portion while the cover is mounted on the vacuum mold. Fourth, applying a vacuum to the vacuum mold so as to draw the exterior surface of the panel portion into conformity with the mold surface of the vacuum mold with the film preventing passage of air through the cover from the interior surface thereof to the exterior surface thereof. Fifth, activating an activatable adhesive layer provided between the interior surface of the panel portion and the imperforate film so as to adhere the imperforate film to the panel portion. Sixth, foaming and curing a foamable material within a cooperating mold generally surrounding the film on the interior surface of the panel portion while the exterior surface thereof is engaged with the mold surface of the vacuum mold so as to provide a cushion body of foamed material constituting an inner layer of a bonded laminate including the panel portion as an outer layer with the film between the inner and outer layers.

17 Claims, 5 Drawing Sheets

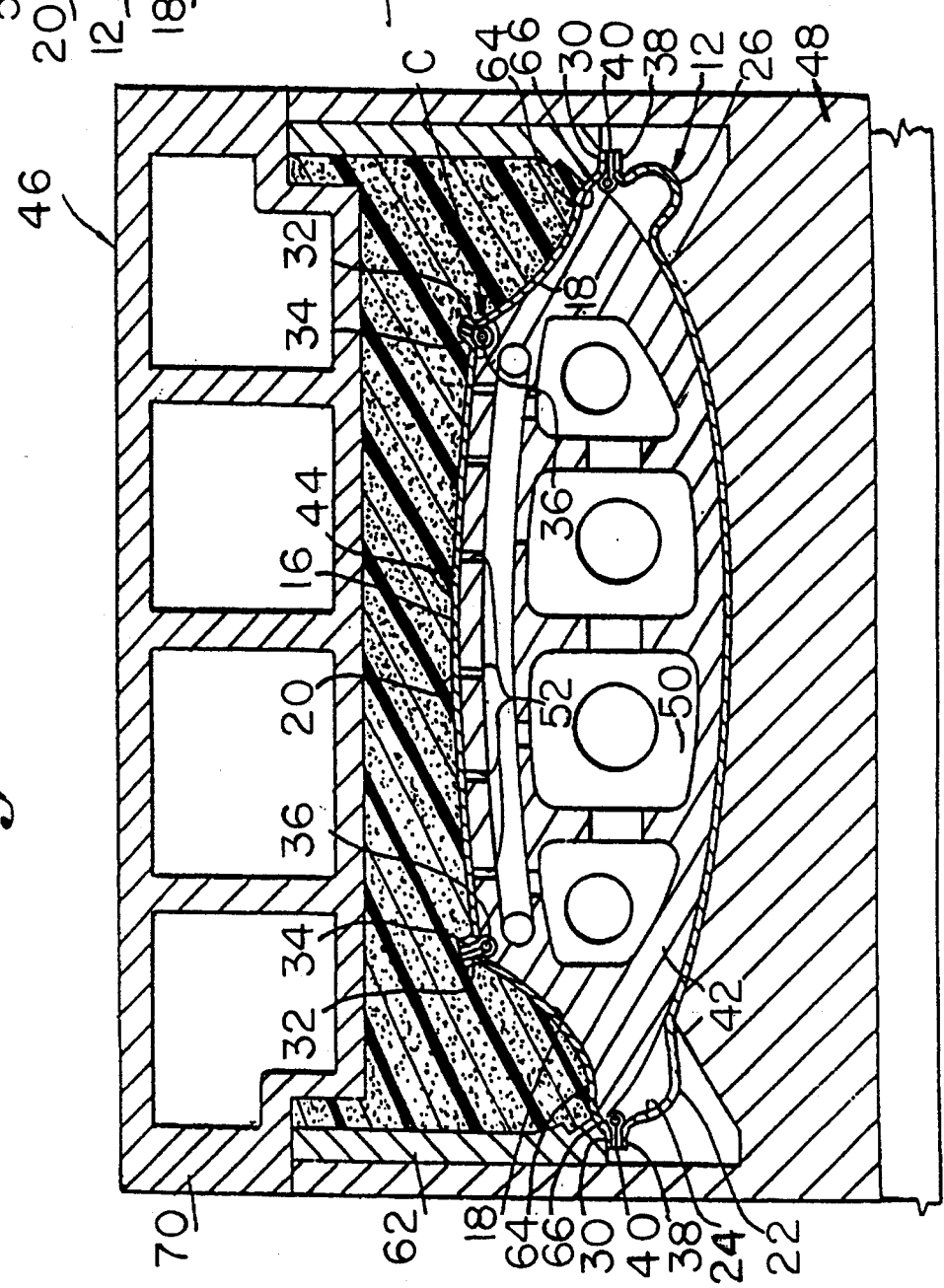

PROVISION OF COVER IMPERMEABILITY IN MOLD IN PLACE SEAT COMPONENT METHOD

This invention relates to vehicle seats and more particularly to methods of integrating the cover panel with a foam pad used in vehicle seats.

Most vehicle seats consist of a rigid frame assembly which includes a seat cushion section and a seat back section. Typically, the seat cushion section supports a seat cushion pad of foam material. In the case of the seat cushion, a cover assembly is provided which includes a seat cushion panel which engages the pad of foam material and a skirt extending from the periphery of the cover panel so as to cover the frame. In the case of the seat back, the pad of foam material is positioned on the front side of the frame and the cover is in the form of a bag which includes a front panel having an interior surface which engages the forward surface of the foam pad and an exterior surface which is engaged by the back of the occupant when seated. A rear panel usually is provided which extends over the back of the frame.

In the overwhelming majority of seats, the foam cushion pads and the covers are separate and manually mounted on the frame and interconnected through suitable fasteners or other means. In recent years, there have been proposed several methods for integrating the cover with the pad so as to eliminate much of the hand labor that is normally required. There are two basic methods involved in these integrated cover and pad systems. One method is to make the cover and the pad separate and then to adhere them together by adhesives. Another method is to form the foam pad in place. That is, rather than to separately form it and adhere it to the cover, the adherence is effected during the foaming and curing of the pad itself. This latter process has obvious advantages. In both methods, it is necessary to foam and cure a foamable material in a pad configuration. It is much more economical to do this in conjunction with the securement of the pad to the cover than it is to perform this operation separately and then have to handle the separately formed pad in a subsequent assembly and securement operation with respect to the cover.

More specifically, the present application relates to methods of the type in which the foaming of the foamable material is accomplished while the cover panel is retained in its final shape by a vacuum mold. The vacuum molding of the cover panel requires that the cover be made of a material which includes an impermeable layer. The usual practice is to utilize a fabric or other material to form the panel which is perforate, to back the material with a thin layer of foam material and then to provide the imperforate layer on the back surface of the foam material. Moreover, it is desirable that the imperforate layer not add significant rigidity or inflexibility to the cover material. Present practice is to utilize a 2 mil layer of polyurethane as the imperforate layer.

Typically, the polyurethane layer is laminated or bonded to one side of a thin layer of foam material and the cover fabric itself is bonded to the other surface of the foam layer. Usually, the panel of the cover which is to receive the cushion of foam material is sewn to additional cover sections. This sewing operation is often performed at locations remote from the location where the foam material is to be foamed on the cover panel. The handling of the cover panel laminate during sewing and subsequent transportation subjected the imperforate layer to accidental puncture in which case during the foam in place process foam can seep through the holes and form hard places in the cover. Rejections of this type are sufficiently costly that it has become desirable to provide the cover panel laminate with a further protective layer of material as, for example, a layer of polyethylene which is much tougher but does not give the same feel as the more flexible polyurethane film. In practices of this type, it is necessary to strip the protective layer from the cover panel prior to placing the cover panel in engagement with the vacuum mold.

Another problem which is presented in the method is when the cover panel is to be made of different materials sewn together to provide a desirable contrasting design or color. In this case, it is necessary, after the panel sections have been sewn together, to provide a seal for the joint. In this regard, see commonly assigned application, Ser. No. 07/728,690, now U.S. Pat. No. 5,231,745 the disclosure of which is hereby incorporated by reference to the present application for background purposes.

It would be highly desirable from a design standpoint to be able to more easily use different fabric sections in making up the cover panel. Indeed, a completely different appearance can be provided by this procedure without in any way varying the shape which is imparted to the cover materials by the vacuum mold.

An object of the present invention is to provide improvements in the method which will largely obviate the problems noted above. In accordance with the principles of the present invention, this objective is achieved by providing a method which includes the steps of providing a cover having an exterior surface which is to present the major exterior appearance of the seat component and which includes a panel portion to be cushioned, the panel portion of the cover being perforate between the interior and exterior surfaces thereof, mounting the cover on a vacuum mold so that the exterior surface of the panel portion is facing a mold surface of the vacuum mold having a shape corresponding with the desired exterior surface shape of the panel portion, mounting an imperforate film over the interior surface of the panel portion while the cover is mounted on the vacuum mold, applying a vacuum to the vacuum mold so as to draw the exterior surface of the panel portion into conformity with the mold surface of the vacuum mold with the film preventing passage of air through the cover from the interior surface thereof to the exterior surface thereof, activating an activatable adhesive layer provided between the interior surface of the panel portion and the imperforate film so as to adhere the imperforate film to the panel portion, and foaming and curing a foamable material within a cooperating mold generally surrounding the film on the interior surface of the panel portion while the exterior surface thereof is engaged with the mold surface of the vacuum mold so as to provide a cushion body of foamed material constituting an inner layer of a bonded laminate including the panel portion as an outer layer with the film between the inner and outer layers.

Another object of the present invention is the provision of a method of the type described which is simple to perform, economical in operation and cost effective.

These and other objects of the present invention will become more apparent during the course of the following detailed description and appended claims.

BRIEF DESCRIPTION OF THE DRAWINGS

The invention will be more fully understood by referring to the following detailed specification and claims taken in connection with the following drawings.

FIG. 10 is an enlarged sectional view taken along the line 10—10 of FIG. 9;

FIG. 11 is an enlarged fragmentary sectional view of the portion of FIG. 10 shown in the circle indicated generally at C in FIG. 10.

DETAILED DESCRIPTION OF THE INVENTION

Figure 1:
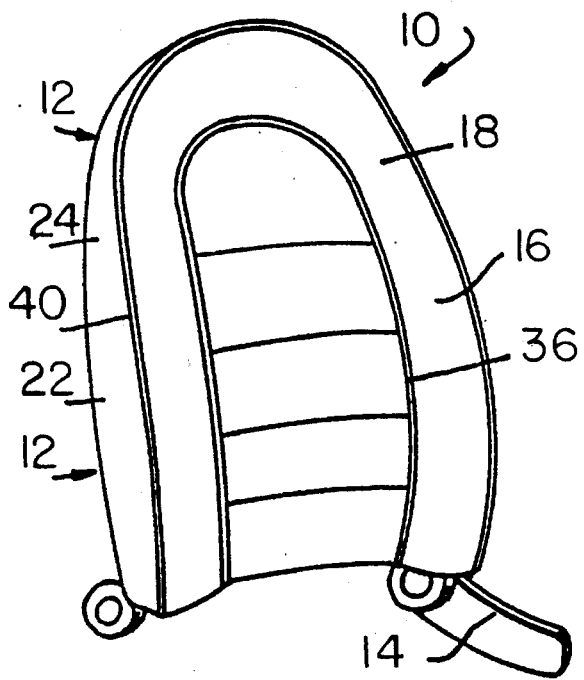
FIG. 1 is a perspective view of an automotive seat back manufactured by the method of the present invention.

Referring now more particularly to the drawings, there is shown in FIG. 1 a seat back, generally indicated at 10. As shown, the seat back 10 includes a cover in the form of an exterior bag-like structure, generally indicated at 12, which extends over an interior frame 14 suitably secured to the frame of the seat bottom (not shown) in accordance with conventional practice.

The bag-like structure 12 includes a front panel 16 presenting an exterior surface 18 at the front of the interior frame 14 and an opposite interior surface 20 and a back panel 22 presenting an exterior surface 24 at the back of the interior frame 14 and an opposite interior surface 26. A body of foamable material 28 is fixed to the interior surface 20 of the front panel in a position forwardly of the interior frame 14.

Figure 2:
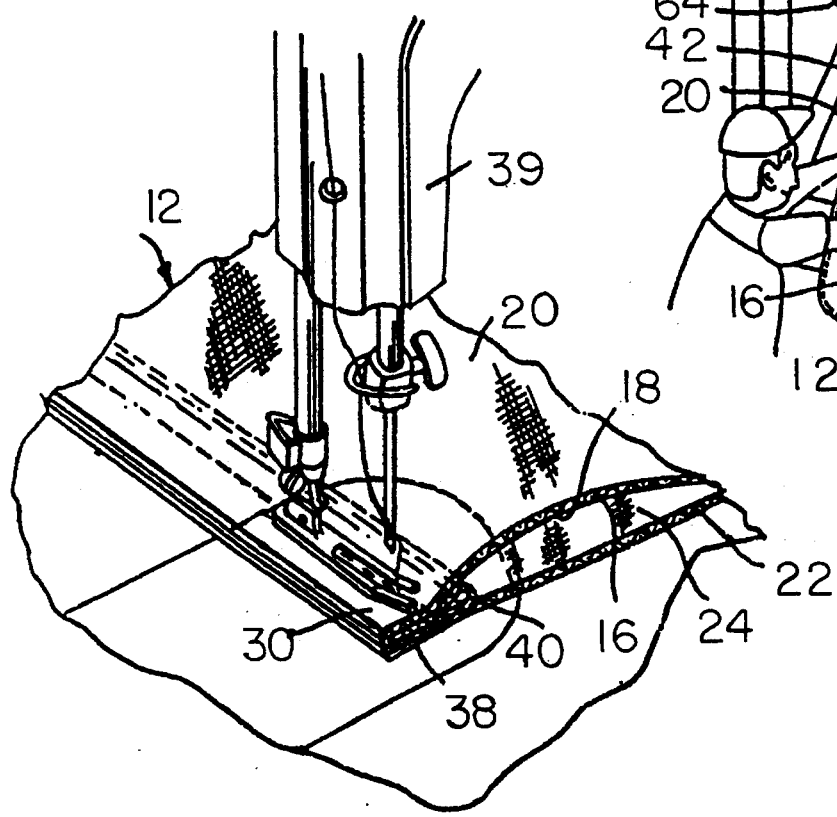

FIG. 2 illustrates a procedure undertaken in an initial step of making the seat back 10. As shown, the bag-like structure 12 consists essentially of the front panel 16 and back panel 22. The front panel 16 is of two-piece construction including an inverted U-shaped outer piece of material providing an outer inverted U-shaped marginal edge 30 and an inner inverted U-shaped marginal edge 32. As can be seen from FIG. 7, the inner marginal edge 32 is sewn to a marginal edge 34 of a central piece of material forming the second piece of the two-piece front panel 16. It will be understood that the front panel may be formed of one piece or more than two pieces of any suitable material, the two-piece construction being merely exemplary.

While the marginal edges 30 and 32 may be secured together in any known fashion, the sewn seam is preferred since this mode of connection is utilized between the front panel 16 and the back panel 18. The sewn seam between the edges 32 and 34 is made so that the stitches are exterior of the interior surface 20 of each front panel piece. In the embodiment shown, a welting strip 36 is sewn between the marginal edges 30 and 32 so that the welting is exposed on the exterior surface 18 of the front panel 16.

FIG. 2 specifically illustrates the sewing of the outer inverted U-shaped marginal edge 30 of the front panel 16 to an outer inverted U-shaped marginal edge 38 of the back panel 22. The seam between the marginal edges 30 and 38 of the two panels is made on a conventional sewing machine 39 so that the exterior of the stitches are on the interior surface 20 and 26 of the two panels 16 and 22. Preferably, a welting strip 40 is sewn between the marginal edges 30 and 38 so that the welting shows exteriorly along with the interior surfaces 18 and 24 of the panels 16 and 22.

It will be noted that the bag-like structure 12 is completed by completing the sewing seam between the marginal edges 30 and 38 and welting strip 40 so that the resultant bag-like structure is completed in a condition wherein the exterior surfaces 18 and 24 of the front and back panels 16 and 22 are disposed in facing relation with respect to one another and the interior surfaces 20 and 26 of the front and back panels face away from one another.

The bag-like structure 12 can be made of any desired material. It is common practice to employ a laminate as the material. Typically, an outer layer of a porous textile material is used with an inner layer of sheet foam. Where porous materials are utilized, the interior of at least the panel portion of the structure on which the pad is to be formed must be rendered imperforate. Heretofore, it has been the practice to include a plastic film layer on the interior surface of the foam sheet. In situation where seams are provided within the panel 16, it becomes necessary to tape the panel seams, see, for example, commonly assigned application Ser. No. 07/728, 690, now U.S. Pat. No. 5,231,745.

In accordance with the principles of the present invention, the procedure for rendering at least panel 16 of the cover 12 imperforate differs from prior practices by first eliminating the inner film layer from the cover laminate used in the sewing process of the cover 12 and any panel seam taping as a step in the process of making a cover. Consequently, the cover 12 made in accordance with the principles of the present invention uses only a two-ply laminate of an exterior porous textile material and an interior foam sheet. This simplifies the sewing operations required by allowing the sewing machines to be used on a thinner less bulky laminate. As previously indicated, it was common prior practice to have the covers sewn into their final configuration at locations separate from the foam forming location, which locations often were quite remote from one another. Where remote sewing was done, the material sewn included a fourth layer of a protective plastic film, such as polyethylene, adjacent the imperforate film laminated to the foam sheet. This fourth layer added considerably more rigidity and thickness to the material being sewn. With the present invention, sewing is completed without either film layer and no taping of the panel seams is done. Thus, not only is sewing simplified but the time heretofore required to strip the outer protective film layer before proceeding with the process is eliminated.

Figure 3:
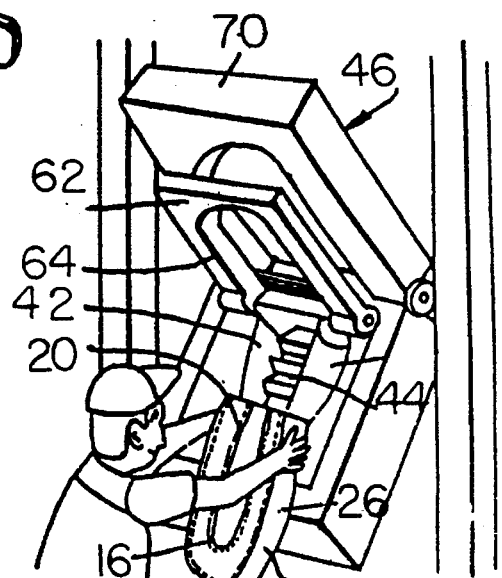
FIGS. 2–4 are pictorial views illustrating the first three successive steps of manufacturing the automotive seat back of FIG. 1.

FIG. 3 pictorially represents the next step in the manufacture of the automobile seat back, which is the step of sliding the bag-like structure 12 onto a tongue-like mold 42 while the bag-like structure 12 is in the condition in which the panels 16 and 22 thereof were sewn together and without inverting the same or if inverted for any reason reinverting the same so as to bring the exterior surface 18 of the front panel 16 into face-to-face relation with a mold surface 44 of the tongue-like mold 42.

As shown, the tongue-like mold 42 forms one part of a mold assembly, generally indicated at 46, which includes a lower mold portion 48 on which the tongue-like mold 42 is pivotally mounted for movement between a bag-engaging and removing position as shown in FIG. 3, and an operative position as shown in FIGS. 8–11. The mold surface 44 has a configuration which conforms with the exterior configuration of the seat back 10 when completed. The tongue-like mold 42 also includes a vacuum system 50 which extends to the mold surface through a series of openings 52.

Figure 4:
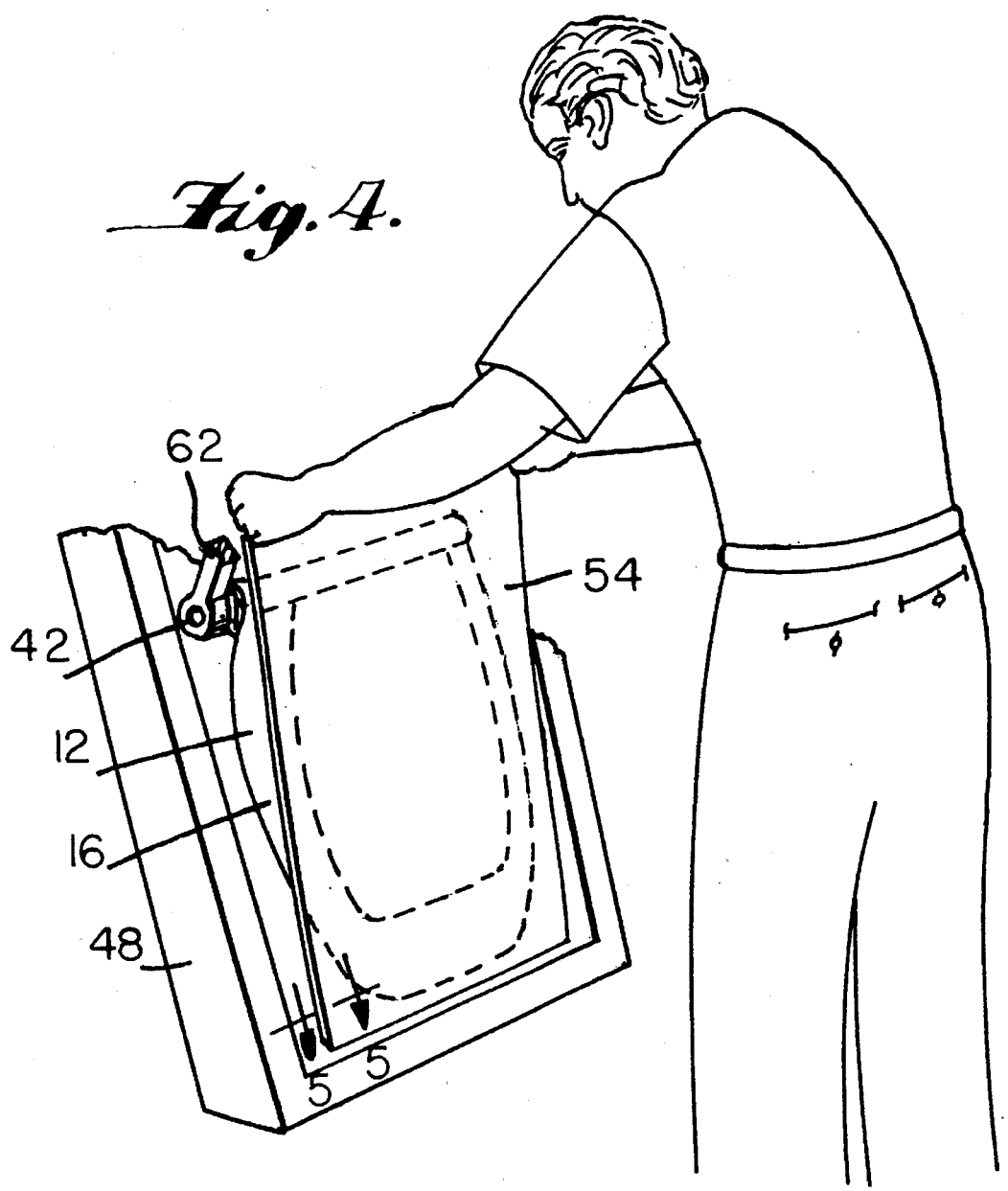
Figure 5:
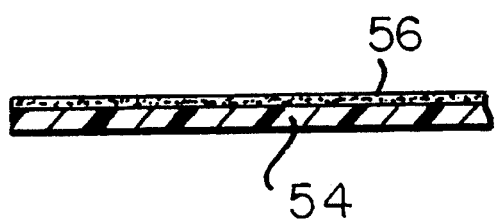
FIG. 5 is an enlarged fragmentary sectional view taken along the line 5—5 of FIG. 4.

FIG. 4 illustrates the next procedure undertaken which is in accordance with the principles of the present invention. After the cover 12 has been mounted on the tongue-like mold 42 and the mold 42 has been moved into its operative position, the next step is to mount an imperforate film 54 over the interior surface of the panel portion 16 while the cover 12 is mounted on the vacuum mold 42. The imperforate film 54 may be made of any suitable material, a preferred material being a 2 mil sheet of polyurethane having a melting point of approximately 400° F. In accordance with the principles of the present invention, an activatable adhesive layer, generally indicated at 56, is provided between the interior surface of the cover panel 16 and the imperforate film 54 mounted so as to enable the imperforate film 54 to be adhered to the interior surface of the panel portion 16 when activated thereon. Preferably, this adhesive layer 54 is provided as a layer on one surface of the imperforate film 54 as shown in FIG. 5. In its broadest aspects, the present invention contemplates the provision of the adhesive layer 56 as an inner lamination on the cover material used in making the cover panel 16. The adhesive is an activate adhesive so that it can be provided in a non-tacky condition to enable the imperforate film to be mounted without unwanted adherence during the mounting operation and any subsequent relative movements which may take place between the interior surface of the panel portion 16 and the imperforate film 54 during the application of the vacuum within the vacuum mold 42.

The activatably adhesive which is preferred is a heat activatable adhesive. However, in its broadest aspects, the present invention contemplates the provision of other types of activatable adhesives, such as, ultraviolet ray activated adhesives, electron beam activated adhesives and the like. See, for example, U.S. Pat. Nos. 4,379,039 and 4,533,723.

As previously indicated, FIG. 5 illustrates a preferred heat activated adhesive 56 and a preferred manner of providing the adhesive 56. As shown, the adhesive 56 is provided on the surface of the imperforate film 54 which is to be mounted on the interior surface of the panel portion 16 as a layer. The layer preferably is applied by spraying although other modes of application are contemplated, as, for example, sheet lamination. The layer need not be continuous or cover the entire surface of the imperforate film so long as enough surface area is covered to effect a secure fixed mounting of the imperforate film 54 on the interior surface of the panel portion 16. A preferred coverage is a cobweb-like layer.

While other types of adhesives are contemplated as indicated above, the preferred adhesive 56 utilized is essentially a heat activatable adhesive, a preferred embodiment being polyurethane having a melting point of 200° F.

FIG. 4 shows the imperforate film 54 with the adhesive layer 56 thereon being manually positioned over the panel portion 16 of the cover 12 while the latter is on the vacuum mold 42. The adhesive 56 is not tacky in its applied condition on the imperforate film 54 so that it is a relatively easy matter to effect an initial positioning of the film and adhesive into engagement over the panel portion 16. While manual mounting is presently preferred, mechanical mounting is contemplated in the broadest aspects of the present invention.

The mold assembly 46 as shown in FIGS. 3 and 6–10 also includes a peripheral foaming mold 62 which is pivoted to the lower mold portion 48 so as to be moved between an inoperable position, such as shown in FIG. 3, which permits the bag-like structure 12 to be inserted on the tongue-like mold 42, and an operative position. The next step in the method is to pivot the peripheral foaming mold 62 from its inoperable position into its operative position, such as shown in FIGS. 6–10, wherein a peripheral edge 64 of the peripheral foaming mold 62 cooperates with a peripheral edge 66 of the tongue-like mold 42 to control the movement of the peripheral portion of the front panel 16 and imperforate film 54 therebetween, which movement is stopped by the engagement of the welting strip 40 of the front panel—back panel seam with the peripheral edges 64 and 66. It will be noted that the peripheral foaming mold 62 engages the periphery of the imperforate film 54 and any excess may be trimmed off. The engagement of the peripheral foaming mold 62 with the periphery of the imperforate film insures that there will be no air leakage through the cover panel 16 when the vacuum of the vacuum mold is applied.

Figure 6:
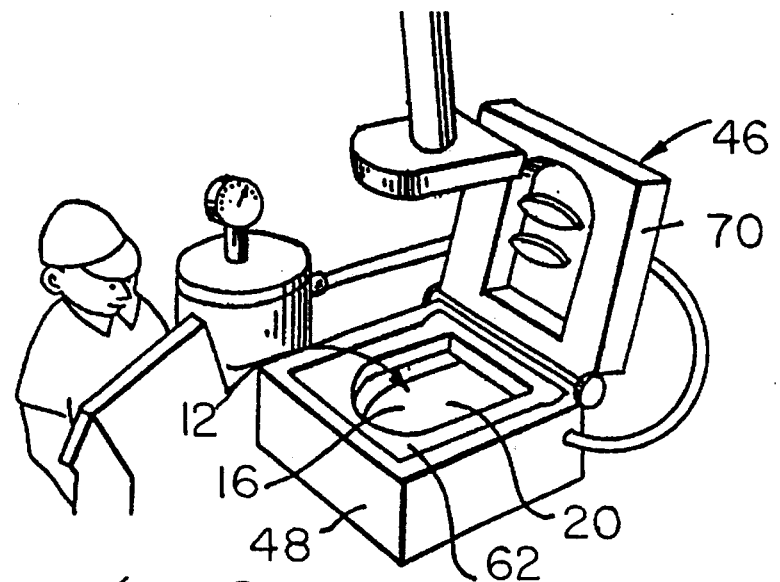
FIGS. 6–9 are pictorial views similar to FIGS. 2–3 illustrating the next four successive steps of manufacturing the automotive seat back of FIG. 1.

FIG. 6 illustrates the next step which is to facilitate the engagement of the front panel 16 with the mold surface 44, if necessary, by lowering a pad or plug assembly 68 through the peripheral mold 62 into the upwardly exposed interior surface 20 of the front panel 16 to move appropriate sections of the front panel 16 into positions of engagement with appropriate sections of the mold surface 44. When the pad assembly has reached its operative position, the vacuum system 50 is energized to fully engage the entire exterior surface 18 of the front panel 16 with the mold surface 44, which in accordance with the principles enunciated in U.S. Pat. No. 5,098,270, may result in the stretching of sections of the front panel depending upon the stopping action provided by the welting strip 40 seam. It will also be noted that the imperforate film 54 may also stretch in local areas as well as the final shape is assumed. Once the front panel 16 is in engagement with the mold surface 44, the configuration of the exterior surface 18 of the front panel 16 is in conformity with the shape it will finally assume, but the vacuum does not set the configuration. The setting is accomplished in future steps.

The use of the pad assembly 68 is style dependent. Where the concavity of the mold surface 44 does not include central flats, vacuum alone is sufficient to effect conformity. Where flats are presented, the pad assembly 68 is utilized. Where plural flats are provided, the pad assembly includes plural pads which may be sequentially engaged.

Figure 7:
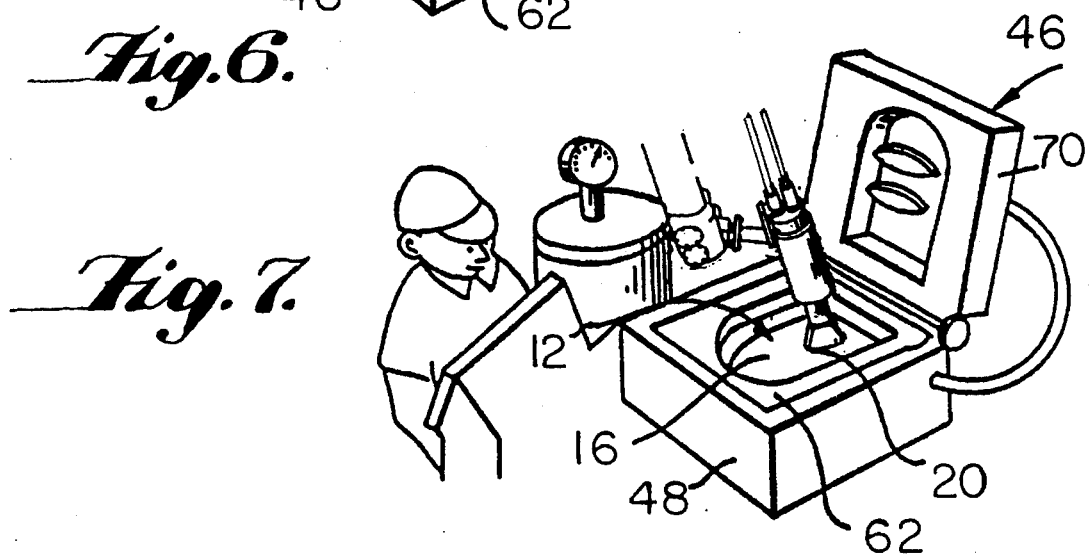

FIG. 7 illustrates the next procedure undertaken in accordance with the preferred aspects of the present invention. Where the adhesive 56 utilized is of the preferred heat activatable type, the next procedure is to apply sufficient heat to the imperforate film and adhesive positioned in engagement with the interior surface of the panel portion 16 to activate the adhesive 56. As shown in FIG. 7, the heating is preferably provided by blowing hot air onto the exposed surface of the imperforate film 54. Any suitable hot air blowing mechanism 58 may be utilized. The preferred example, as shown, is a commercial hot air blower, merchandized by AcroLab as a Superserp Hot Air Torch Model which has a rating of 20,000 watts. The hot air blower may be used in a portable form, however preferably it is mounted on a movable support or boom 60. The boom 60 preferably constitutes an arm of a robotic mechanism enabling the movement of the hot air over the imperforate film 54 to be repeated accurately. The blower 58 has a closed loop system that measures temperature at the torch and adjusts heat by varying current. The temperature is adjustable.

In this way the adhesive 56 is brought to its melting point temperature of 200° by heating the imperforate film 54 above that temperature but well below its melting point of 400° F. The heating time is dependent upon the surface area of the panel portion which in the case of a minivan bench seat can be extensive. As exemplary heating time for a bench seat is approximately 12–14 seconds.

Figure 8:
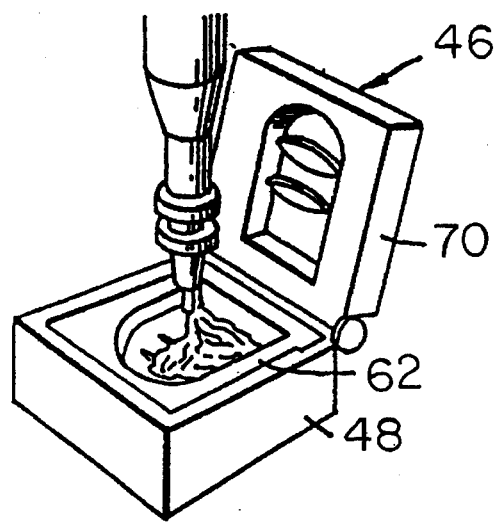

FIG. 8 illustrates the next step in the process of the present invention which is to feed into the open peripheral foaming mold 62 and onto the interior surface 20 of the front panel 16 an amount of heat foamable and curable material which will fill the peripheral frame when closed by upper mold portion 70 forming a final part of the mold assembly 46. As shown, the upper mold portion 70 is pivoted to the lower mold portion 48 between an open position, such as shown in FIGS. 3, 6–8 permitting the foamable material to be added, and a closed position, such as shown in FIGS. 9 and 10 wherein the cooperating peripheral foaming mold 62 is further compressed into engagement with the interior surface 20 of the front panel.

Figure 9:
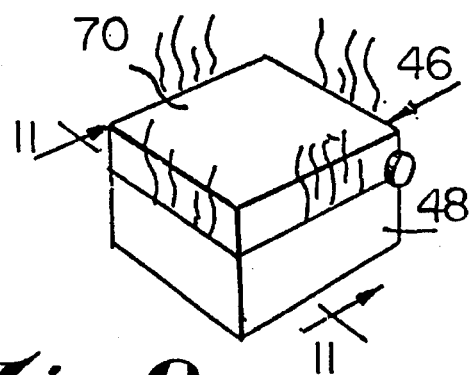

FIGS. 9 and 10 illustrate the next step in the process of the present invention which is to close upper mold portion 70 and to cure the foamable material by heating so that it foams and rises to fill the space defined by the upwardly facing interior surface 20 of the front panel 16, the interior peripheral surface of the peripheral mold 62, and the downwardly facing surface of the closure mold 70.

FIG. 11 illustrates a particular advantage of the present process which is that a panel portion 16 which has interior seams need not be individually taped, as before, but are automatically covered by the mounting of the imperforate film 54 in accordance with the principles of the present invention as enunciated above. This feature of the present invention is important in allowing appearance changes in the final product to be made by simply utilizing different colors and materials within the periphery of the front panel 16 and sewing them together to make the front panel 16 since the addition of seams within the front panel does not require any additional effort or manipulations as in the past. In this way, radically different design appearance changes can be made without the necessity to change tooling. Stated differently, such radical changes can be made without changing shape.

Figure 12:
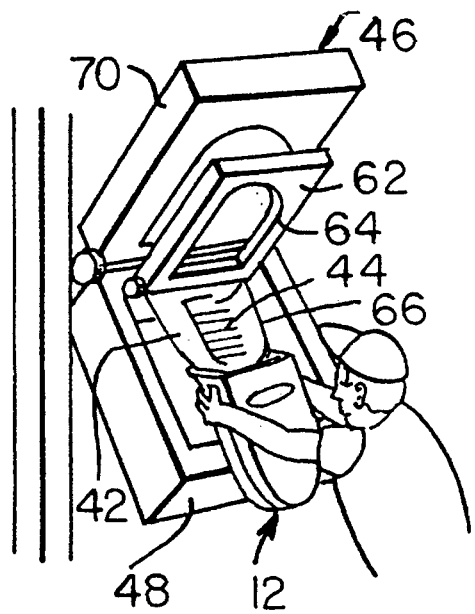
FIGS. 12–14 are pictorial views similar to FIGS. 8–10 illustrating the last three successive steps of manufacturing the automotive seat back of FIG. 1.

FIG. 12 illustrates the next step in the process which is to move the closure mold 70 from its operative position into its inoperative position and then the peripheral mold 62 from its operative position into its inoperative position and finally the tongue-like mold 42 into its bag receiving and removing position. Next, the operator removes the bag-like structure 12 with the body of foamable material 28 integrally attached to the interior surface 20 of the front panel 16 thereof.

Figure 13:

FIG. 13 illustrates the next step in the process which is to invert the bag-like structure 12 with the integral body of foamable material 28 thereof so that the exterior surfaces 18 and 24 of the panels 16 and 22 are disposed exteriorly thereof and face generally in opposite directions and the interior surfaces 20 and 26 of the panels 16 and 22 and the body of foamable material 28 are disposed interiorly thereof.

Figure 14:
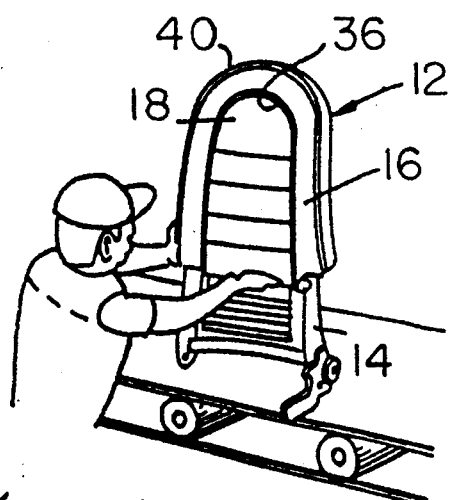

FIG. 14 illustrates a final step in manufacturing the above automobile seat wherein the inverted bag-like structure 12 with the body of foamable material 28 adhered to the interior surface 20 of the front panel 16 is mounted over the frame 14 of the seat back 10. The lower edges are suitably affixed under the bottom of the frame 14 to complete the assembly of the seat back 10.

Figure 15:
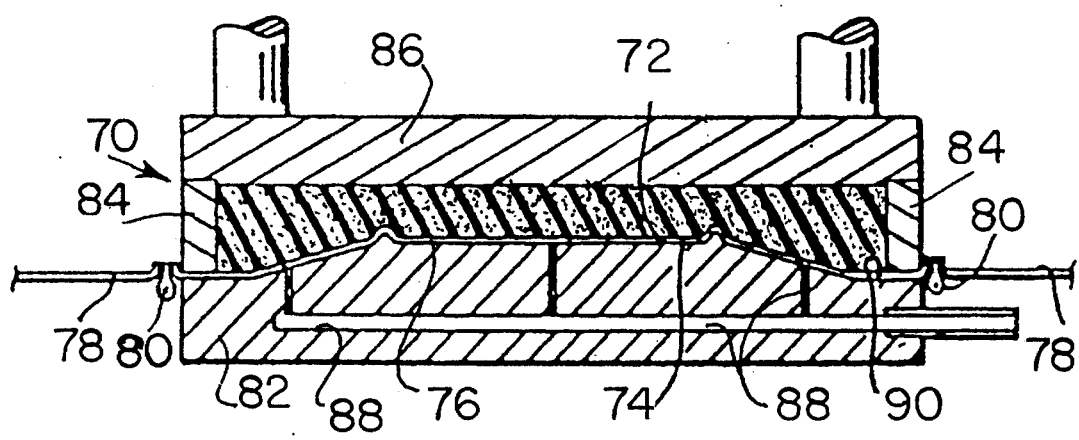
FIG. 15 is a view similar to FIG. 11 showing the mold assembly used in making a seat cushion component.

Referring now more particularly to FIG. 15, there is shown therein a modified form of mold assembly, generally indicated at 70, which is utilized in molding a foam cushion 72 onto a cover, generally indicated at 74, in the manner similar to the method previously described except that the cover 74 and cushion 72 are for a vehicle seat rather than a seat back. Basically, the same process is utilized with variations relating to the particular configuration of the seat cover 74 and cushion 72. The seat cover 74 includes a main seat panel 76 and a skirt 78 which is sewn to the periphery of the seat panel 76 by a seam including welting strip 80. The seat panel 76 on which the cushion 72 is formed is therefore directly opposite an opening in the cover 74 in contrast with the seat back cover 12 in which the panel 16 which receives the cushion 28 is opposed by a back panel. Because of this difference, the cover 74 can be handled quite readily so as to obtain access to either surface of the seat panel 76 and the use of a movable tongue-like mold part is not necessary.

In accordance with the principles of the present invention, the cover 74 is made of porous laminate material by the same sewing operation as previously described.

As shown in FIG. 15, the mold assembly 78 includes a lower vacuum mold part 82, a peripheral mold part 84, and an upper mold part 86. As before, the lower mold part 82 includes vacuum openings 88 which convert the mold part into a vacuum mold 82.

The vacuum mold 82 includes a mold surface 90 which is shaped to define the configuration of the upper exterior surface of the seat panel 76. It can be seen that the cover 74 can be simply extending onto the mold surface 90. Thereafter, in accordance with the principles of the present invention, an imperforate film having an adhesive layer thereon is mounted on the interior surface of the seat panel 76 and the adhesive is activated by blowing hot air on the mounted imperforate film as previously indicated. Thereafter, the peripheral mold part 84 is pivoted to engage the imperforate film along the periphery of the seat cover panel periphery, as before. Thereafter, the vacuum is applied to conform the shape of the panel portion 76 to the shape of the mold surface 90. As before, foamable expandable material is provided onto the upwardly facing interior surface of the seat panel 76 within the peripheral mold part 84 and thereafter the upper mold part 86 is moved into engagement to complete the assembly of the components of the mold assembly 78. After the foam has been cured, the cover with the foam thereon is removed from the mold assembly and mounted on the seat cushion frame.

For purposes of completing the present disclosure, the disclosure of all of the above-identified applications and patents are hereby incorporated by reference into the present specification.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A method of making a cushioned seat component which includes the steps of providing a cover in a condition in which it is devoid of an imperforate film laminated thereto and having an exterior surface which is to present the major exterior appearance of the seat component and which includes a panel portion to be cushioned, the panel portion of the cover being perforate between the interior and exterior surfaces thereof, mounting the cover in the aforesaid condition on a vacuum mold so that the exterior surface of the panel portion is facing a mold surface of the vacuum mold having a shape corresponding with the desired exterior surface shape of the panel portion, mounting an imperforate film over the interior surface of the panel portion while the cover is mounted on the vacuum mold, applying a vacuum to the vacuum mold so as to draw the exterior surface of the panel portion into conformity with the mold surface of the vacuum mold having said shape corresponding with the desired exterior surface shape of the panel portion so that said panel portion is brought generally into conformity with its desired final shape, with the film preventing passage of air through the cover from the interior surface thereof to the exterior surface thereof, activating an activatable adhesive layer provided between the interior surface of the panel portion and the imperforate film so as to adhere the imperforate film to the panel portion while said panel portion remains generally in conformity with its desired final shape, and foaming and curing a foamable material within a cooperating mold generally surrounding the film on the interior surface of the panel portion while the exterior surface thereof is engaged with the mold surface of the vacuum mold having said shape corresponding with the desired exterior surface shape of the panel portion so as to provide a cushion body of foamed material constituting an inner layer of a bonded laminate including said panel portion as an outer layer with the film between the inner and outer layers.

2. A method as defined in claim 1 wherein said panel portion includes a plurality of panel sections defining different exterior surfaces with a periphery of the panel portion, said plurality of panel sections being secured together along one or more seams within the periphery of the panel portion.

3. A method as defined in claim 2 wherein said panel sections are different by virtue of different colors thereof.

4. A method as defined in claim 2 wherein the exterior surfaces of said panel sections are different by virtue of different fabric textures.

5. A method as defined in claim 1 wherein the panel portion of the produced cover is a seat panel portion having a periphery, said cover including skirt portions secured to the periphery of said seat panel portion.

6. A method as defined in claim 5 wherein said seat panel portion includes a plurality of panel sections having different exterior surfaces secured together along one or more seams within the periphery of said seat panel portions.

7. A method as defined in claim 6 wherein the exterior surfaces of said panel sections are different by virtue of different colors.

8. A method as defined in claim 7 wherein the exterior surfaces of said panel sections are different by virtue of different fabric textures.

9. A method as defined in claim 1 wherein the panel portion of the produced cover is a seat back portion having a periphery, said cover including edge portions and a back portion secured together to form a bag-like structure having an open end and a closed end, said cover being mounted on a tongue-like vacuum mold by telescoping the open end of said bag-like structure thereover with the interior surface of a seat back panel portion inverted outwardly and the exterior surface inverted inwardly with respect to said bag-like structure, and inverting the bag-like structure after the foaming and curing procedure so as to dispose the exterior surface of the seat back panel portion outwardly and the interior surface thereof with said cushion body bonded thereto inwardly with respect to said bag-like structure.

10. A method as defined in claim 9 wherein said seat back panel portion includes a plurality of panel sections having different exterior surfaces secured together along one or more seams within the periphery of said seat back panel portion.

11. A method as defined in claim 10 wherein the exterior surfaces of said panel sections are different by virtue of different colors.

12. A method as defined in claim 11 wherein the exterior surfaces of said panel sections are different by virtue of different fabric textures.

13. A method as defined in claim 1 wherein said activatable adhesive layer is provided as a layer on said imperforate film so as to be mounted between the interior surface of said panel portion and the imperforate film when said imperforate film is mounted over the interior surface of the panel portion.

14. A method as defined in claim 13 wherein said activatable adhesive layer is formed of a heat activatable adhesive.

15. A method as defined in claim 14 wherein said layer of heat activatable adhesive is activated by blowing hot air on an exterior surface of said imperforate film after the interior surface thereof with said layer of heat activatable adhesive thereon has been mounted on the interior surface of said panel portion and the vacuum has been applied.

16. A method as defined in claim 15 wherein said film is a 2 mil sheet of polyurethane having a melting point of 400° F. and said layer of heat activatable adhesive is a sprayed on cobweb-like layer of polyurethane having a melting point of 200° F.

17. A method as defined in claim 1 wherein said film is a 2 mil sheet of polyurethane having a melting point of 400° F. and said activatable adhesive layer is provided by spraying on a surface of said sheet of polyurethane a cobweb-like layer of polyurethane having a melting point of 200° F.

* * * * *